United States Patent
Wiegand et al.

[15] 3,705,157
[45] Dec. 5, 1972

[54] AZOLYLPYRIDAZINE COMPOUNDS AND QUATERNARY SALTS THEREOF

[72] Inventors: Gretchen Ellen Wiegand, Pearl River, N.Y. 10965; Victor John Bauer, Montvale, N.J. 07645; Sidney Robert Safir, River Edge, N.J. 07661

[73] Assignee: American Cyanamid Company, Stamford, Conn.

[22] Filed: Oct. 19, 1970

[21] Appl. No.: 82,063

[52] U.S. Cl..............................260/250 A, 424/250
[51] Int. Cl. ................................C07d 51/04
[58] Field of Search................................260/250 A

[56] References Cited

UNITED STATES PATENTS

| | | | |
|---|---|---|---|
| 3,079,392 | 2/1963 | Pesson | 260/250 A |
| 3,096,329 | 7/1963 | Steck | 260/250 A |
| 2,918,469 | 12/1959 | Carbon | 260/250 A |

*Primary Examiner*—Nicholas S. Rizzo
*Attorney*—Ernest Y. Miller

[57] ABSTRACT

The preparation of azolylpyridazine compounds and their conversion to quaternary azolylpyridazinium slats is described. The salts are useful for their ability to lower blood glucose in warm-blooded animals.

10 Claims, No Drawings

AZOLYLPYRIDAZINE COMPOUNDS AND QUATERNARY SALTS THEREOF

DESCRIPTION OF THE INVENTION

This invention relates to new organic compounds; more particularly, it relates to quaternary azolylpyridazinium salts, intermediates for preparation of the salts, and methods of preparing the same.

The new compounds of the present invention may be illustrated by the following formulae:

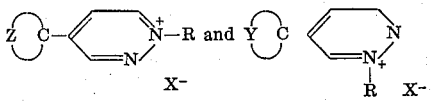

wherein R is lower alkyl; Z is a trivalent radical selected from the group consisting of

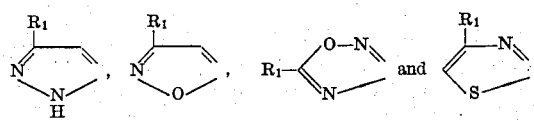

; Y is a trivalent radical selected from the group consisting of

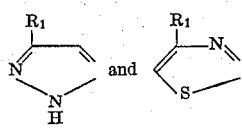

$R_1$ is selected from the group consisting of hydrogen and lower alkyl; and X is a monovalent pharmaceutically acceptable anion.

The term lower alkyl is intended to include those alkyl groups having from one to four carbon atoms.

The compounds of the present invention may be prepared by quaternization of an appropriate azolylpyridazine base with, for example, a lower alkyl halide at a temperature of 0° to 150° C., with or without a solvent such as a lower alkyl alcohol, for a time of 1 minute to 24 hours in an open vessel or a sealed bomb. The requisite pyrazolylpyridazine and isoxazolylpyridazine base are formed from hydrazine or hydroxylamine and a 1-(4-pyridazinyl)-1,3-alkylidione, which is prepared by the condensation of ethyl pyridazine-4-carboxylate and a methyl ketone. The requisite thiazolylpyridazine base is prepared from pyridazine-4-thiocarboxamide and an α-haloketone, and the requisite oxadiazolylpyridazine base is prepared by the reaction of pyridazine-4-carboxamidoxime with an alkanoic acid anhydride. These reactions are illustrated schematically below:

1.

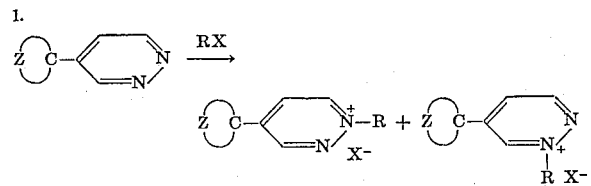

2.

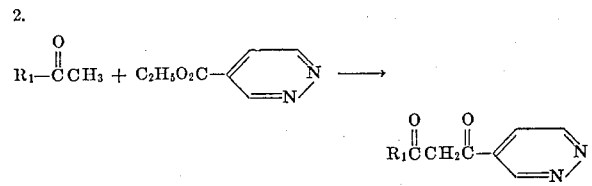

3.

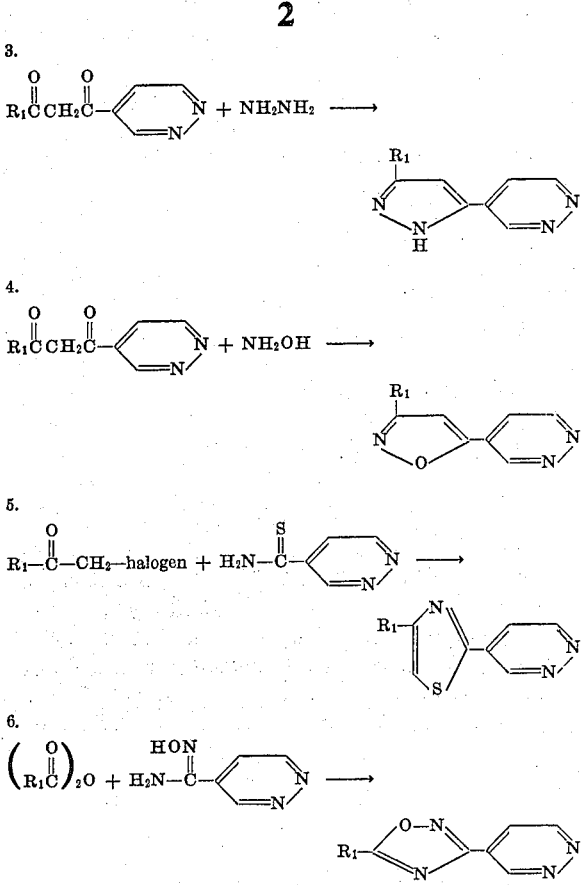

wherein R is lower alkyl; Z is selected from the group consisting of

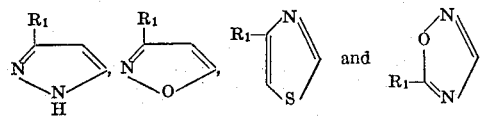

$R_1$ is selected from the group consisting of hydrogen and lower alkyl; and X is a monovalent pharmaceutically acceptable anion.

The intermediate pyridazine bases before quaternization are novel compounds and are considered to be a part of the present invention. They may be illustrated by the following formula:

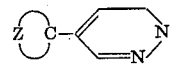

wherein Z is as defined above.

Among the compounds of the present invention are, for example: 4-(3-methyl-5-pyrazolyl)pyridazine, 4-(5-isoxazolyl)-pyridazine, 4-(4-methyl-2-thiazolyl)pyridazine, 4-(5-methyl-1,2,4-oxadiazol-3-yl)pyridazine, 1-methyl-4-[3(5)-methyl-5(3)-pyrazolyl]pyridazinium chloride, 1-ethyl-5-[3(5)-methyl-5(3)-pyrazolyl]pyridazinium iodide, 1-propyl-4-(3-methyl-5-isoxazolyl)-pyridazinium bromide, 1-butyl-4-(4-methyl-2-thiazolyl)pyridazinium chloride, 1-ethyl-5-(2-thiazolyl)pyridazinium bromide, and 1-methyl-4-(5-methyl-1,2,4-oxadiazol-3-yl)pyridazinium iodide.

The compounds of the present invention show hypoglycemic activity based on the following data which shows a reduction of the blood sugar levels in warm-blooded animals such as mice. When the compounds are administered orally to normal mice, a reduction of blood sugar levels is observed. Mice used in these studies are CF-1 (Carworth Farms, 25–30 g.). The quaternary salts of this invention are administered by gavage as 0.5 percent carboxymethylcellulose suspensions; control animals receive an equivalent volume of vehicle. Food is withheld from animals after dosing. Blood glucose is determined 3 to 5 hours after dosing, on blood samples obtained from the retrobulbar plexuses of mice, by the method of Hoffman [J. Biol. Chem., 120, 51 (1937)] as adapted to the Technicon AutoAnalyzer and is expressed as percent change from predose values. The testing data are summarized in the table. Comparable data for the antidiabetic drugs phenformin and tolbutamide are also presented.

TABLE

Decrease in Blood Glucose in Normal Mice After Oral Administration of Quaternary Azolylpyridazinium Salts

| Compound | Dose mmoles/ kg. | Hours After Dosing | Percent Decrease in Blood Glucose |
| --- | --- | --- | --- |
| 1-methyl-4-[3(5)-methyl-5 (3)pyrazolyl]pyridazinium iodide | 1.5 | 5 | 23 ± 7 |
| 1-methyl-5-[3(5)-methyl- 5(3)pyrazolyl]pyridazinium iodide | 3.0 | 5 | 62 ± 9 |
| 1-methyl-4-(3-methyl-5- isoxazoly)pyridazinium iodide | 1.5 | 5 | 30 ± 5 |
| 1-methyl-4-(4-methyl-2- thiazolyl)pyridazinium iodide | 1.5 | 6 | 29 ± 6 |
| 1-methyl-5-(4-methyl-2- thiazolyl)pyridazinium iodide | 1.5 | 6 | 28 ± 8 |
| 1-methyl-4-(5-methyl-1,2,4- oxadiazol-3-yl)-pyridazinium iodide | 0.5 | 6 | 34 ± 3 |
| tolbutamide | 1.5 | 5 | 36 ± 5 |
| phenformin | 2.2 | 5 | 38 ± 10 |

These results show that the compounds of the present invention are useful, as are tolbutamide and phenformin, in the lowering of blood glucose levels in warm-blooded animals. Their effectiveness is comparable to that seen with phenformin and tolbutamide. The present compounds may be orally administered at a dose of 0.5 mg. to 100 mg. per kg. of body weight per day.

The active components of this invention can be used in compositions such as tablets; the principal active ingredient is mixed with conventional tableting ingredients such as corn starch, lactose, sucrose, sorbitol, talc, stearic acid, magnesium stearate, dicalcium phssphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete inits suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

DETAILED DESCRIPTION

The preparation of intermediates and active components of this invention along with compositions containing the latter will be described in greater detail in the following examples.

EXAMPLE 1

Preparation of 1-(4-Pyridazinyl)-1,3-butanedione

A mixture of 7.7 g. of ethyl pyridazine-4-carboxylate, 8.4 g. of acetone, 3.6 g. of sodium methoxide, and 85 ml. of benzene is heated under reflux with stirring for 7 hours, cooled, and diluted with 90 ml. of water. The aqueous phase is collected, washed with benzene, acidified to pH 5, and extracted with ether. The ether solution is dried over anhydrous magnesium sulfate and concentrated to a solid. Sublimation at 105° (20 mm.) provides pale yellow needles, melting point 110°–111° C.

EXAMPLE 2

Preparation of 4-[3(5)-Methyl-5(3)-pyrazolyl]pyridazine

To 2.7 g. of 1-(4-pyridazinyl)-1,3-butanedione (Example 1) is added slowly 10 ml. of 100 percent hydrazine hydrate. The mixture is stirred at room temperature for 0.5 hour, heated on a steam bath for 5 minutes, and stored at 5° C. for 48 hours. The solid which separates is collected, washed with water, and recrystallized from acetonitrile to provide colorless crystals, melting point 183°–184° C.

EXAMPLE 3

Preparation of 4-(3-Methyl-5-isoxazolyl)pyridazine

To a stirred solution of 1.35 g. of 1-(4-pyridazinyl)-1,3-butanedione, (Example 1) 0.88 g. of hydroxylamine hydrochloride, 15 ml. of ethanol, and 25 ml. of water is slowly added 0.88 g. of sodium carbonate. The solution is heated under reflux for 12 hours, diluted with water, and extracted with benzene. The benzene solution is dried over anhydrous magnesium sulfate and concentrated to a solid. Recrystallization from chloroformhexane provides colorless crystals, melting point 154°–156° C.

EXAMPLE 4

Preparation of 4-(4-Methyl-2-thiazolyl)pyridazine

A solution of 2.1 g. of pyridazine-4-thiocarboxamine, 1.9 g. of 1-chloro-2-propanone, and 100 ml. of ethanol is heated under reflux for 6 hours and concentrated to dryness. The solid residue is dissolved in water, and the solution is made basic with sodium hydroxide and extracted with chloroform. The chloroform solution is dried over anhydrous magnesium sulfate and concentrated to a solid. Recrystallization from chloroformhexane gives yellow crystals, melting point 131°–133° C.

EXAMPLE 5

Preparation of 4(5-Methyl-1,2,4-oxadiazol-3-yl)pyridazine

A solution of 0.7 g. of 4-pyridazinecarboxamidoxime and 5 ml. of acetic anhydride is heated under reflux for 3 hours. The excess acetic anhydride is distilled, and the oily residue is diluted with water. The mixture is adjusted to pH 6 with sodium carbonate and extracted with chloroform. The chloroform solution is dried over anhydrous magnesium sulfate and concentrated to a solid. Recrystallization from hexane gives colorless crystals, melting point 133°–134° C.

EXAMPLE 6

Preparation of 1-Methyl-4-[3(5)-methyl-5(3)-pyrazolyl]pyridazinium Iodide and 1-Methyl-5-[3(5)-methyl-5(3)-pyrazolyl]pyridazinium Iodide A solution of 0.65 g. of 4-[3(5)-methyl-5(3)-pyrazolyl]-pyridazine, 1.5 ml. of methyl iodide, and 30 ml. of methanol is allowed to stand at room temperature for 72 hours, concentrated to a volume of 20 ml., and cooled. The yellow solid which separates is collected and recrystallized from methanol to provide yellow crystals, melting point 233°–234° C. (dec.), of 1-methyl-4-[3(5)-methyl-5(3) pyrazolyl]pyridazinium iodide.

The mother liquor is diluted with ether, and the solid which separates is collected and recrystallized from isopropyl alcohol to provide yellow crystals, melting point 232° C. (dec.), of 1-methyl-5-[3(5)-methyl-5(3)-pyrazolyl]pyridazinium iodide.

EXAMPLE 7

Preparation of 1-Methyl-4-(3-methyl-5-isoxazolyl)pyridazinium Iodide and 1Methyl-5-(3-methyl-5-isoxazolyl)pyridazinium Iodide A solution of 0.5 g. of 4-(3-methyl-5-isoxazolyl)pyridazine, 1.0 ml. of methyl iodide, and 20 ml. of methanol is stirred at room temperature for 48 hours and then cooled. The orange solid which separates is collected and recrystallized from ethanol to provide deep orange crystals, melting point 210°–211° C. (dec.), of 1-methyl-4(3-methyl-5isoxazolyl)pyridaziniu m iodide.

The mother liquor is diluted with ether, and the solid which separates is collected and recrystallized from methanol to give orange crystals, melting point 166°–167° C. (dec.), of 1-methyl-5-(3-methyl-5-isoxazolyl)pyridazinium iodide.

EXAMPLE 8

Preparation of 1-Methyl-4-(4-methyl-2-thiazolyl)pyridazinium Iodide and 1-Methyl-5-(4-methyl-2-thiazolyl)pyridazinium Iodide A solution of 0.4 g. of 4-(4-methyl-2-thiazolyl)pyridazine, 1.0 ml. of methyl iodide, and 15 ml. of methanol is stirred at room temperature for 48 hours and then cooled. The red solid which separates is collected and recrystallized from methanol to give red crystals, melting point 220°–222° C. (dec.), of 1-methyl-4-(4-methyl-2-thiazolyl)pyridazinium iodide.

The mother liquor is diluted with ether, and the orange solid which separates is recrystallized from acetone to provide orange crystals, melting point 171° C. (dec.), of 1-methyl-5-(4-methyl-2-thiazolyl)pyridazinium iodide.

EXAMPLE 9

Preparation of 1-Methyl-4-(5-methyl-1,2,4-oxadiazol-3-yl)pyridazinium Iodide and 1-Methyl-5-(5-methyl-1,2,4-oxadiazol-3-yl)pyridazinium Iodide A solution of 0.75 g. of 4-(5-methyl-1,2,4-oxadiazol-3-yl)pyridazine, 1.5 ml. of methyl iodide, and 30 ml. of methanol is stirred at room temperature for 72 hours and concentrated to dryness. The residue is recrystallized from acetone to give red crystals, melting point 186°–187° C. (dec.), of 1-methyl-4-(5-methyl-1,2,4-oxadiazol-3-yl)pyridazinium iodide.

The mother liquor is diluted with ether, and the solid which separates is collected and recrystallized from ethanol-ether to provide brown crystals, melting point 126°–127° C. (dec.), of 1-methyl-5-(5-methyl-1,2,4-oxadiazol-3-yl)pyridazinium iodide.

What is claimed is:

1. A quaternary azolylpyridazinium salt of the formulas:

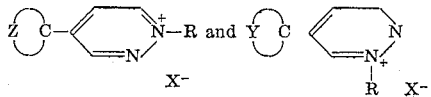

wherein R is lower alkyl; Z is a trivalent radical selected from the group consisting of

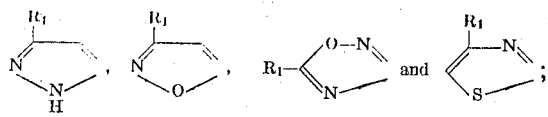

Y is a trivalent radical selected from the group consisting of

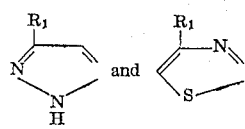

$R_1$ is selected from the group consisting of hydrogen and lower alkyl; and X is a monovalent pharmaceutically acceptable anion selected from the group consisting of bromide, chloride and iodide.

2. The quaternary azolylpyridazinium salt according to claim 1: 1-methyl-4-[3(5)-methyl-5(3)-pyrazolyl]pyridazinium iodide.

3. The quaternary azolylpyridazinium salt according to claim 1: 1-methyl-4-(3-methyl-5-isoxazolyl)pyridazinium iodide.

4. The quaternary azolylpyridazinium salt according to claim 1: 1-methyl-5-(4-methyl-2-thiazolyl)pyridazinium iodide.

5. The quaternary azolylpyridazinium salt according to claim 1: 1-methyl-4-(5methyl-1,2,4-oxadiazol-3-yl)pyridazinium iodide.

6. An azolylpyridazine compound of the formula:

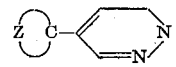

wherein Z is a trivalent radical selected from the group consisting of

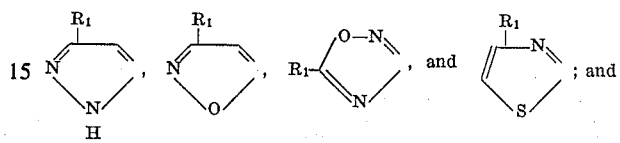

$R_1$ is selected from the group consisting of hydrogen and lower alkyl.

7. The azolylpyridazine according to claim 6: 4-[3(5)-methyl-5(3)-pyrazolyl]pyridazine.

8. The azolylpyridazine according to claim 6: 4-(3-methyl-5-isoxazolyl)pyridazine.

9. The azolylpyridazine according to claim 6: 4-(4-methyl-2-thiazolyl)pyridazine.

10. The azolylpyridazine according to claim 6: 4-(5-methyl-1,2,4-oxadiazol-3-yl)pyridazine.

* * * * *